United States Patent
Beach

(10) Patent No.: US 6,233,841 B1
(45) Date of Patent: May 22, 2001

(54) DEHYDRATION PLANT

(75) Inventor: Stephen Napier Beach, Mosman Park (AU)

(73) Assignee: Australian Rural Dehydration Enterprise Pty. Ltd., Perth (AU)

(*) Notice: Subject to any disclaimer, the term of this patent is extended or adjusted under 35 U.S.C. 154(b) by 0 days.

(21) Appl. No.: 09/424,713

(22) PCT Filed: May 22, 1998

(86) PCT No.: PCT/AU98/00379

§ 371 Date: Nov. 29, 1999

§ 102(e) Date: Nov. 29, 1999

(87) PCT Pub. No.: WO98/53711

PCT Pub. Date: Dec. 3, 1998

(30) Foreign Application Priority Data

May 28, 1997 (AU) .................................................. PO 7056

(51) Int. Cl.[7] .................................................. F26B 3/34
(52) U.S. Cl. .................. 34/262; 34/264; 34/265; 34/275; 34/418; 34/203
(58) Field of Search .................. 34/259, 262, 264, 34/265, 275, 381, 401, 418, 429, 61, 62, 66, 76, 77, 78, 202, 203, 212, 219; 62/94, 271; 219/697, 701, 752; 99/352, 325, 443 C, 466; 426/467, 496, 503

(56) References Cited

U.S. PATENT DOCUMENTS

| | | |
|---|---|---|
| 4,045,638 | 8/1977 | Chiang et al. . |
| 4,196,526 | 4/1980 | Berti . |
| 4,409,453 * | 10/1983 | Smith .................................. 34/259 X |
| 4,468,865 | 9/1984 | Inagaki . |
| 4,485,564 | 12/1984 | Iverlund et al. . |
| 4,640,020 | 2/1987 | Wear et al. . |
| 4,720,924 | 1/1988 | Hradecky et al. . |
| 5,074,200 | 12/1991 | Ruozi . |
| 5,510,601 * | 4/1996 | Smith et al. .................... 219/679 |
| 5,541,390 * | 7/1996 | Pinceloup ........................ 219/701 |
| 5,816,138 * | 10/1998 | Benson et al. ................... 99/355 |
| 5,934,178 * | 8/1999 | Caridis et al. ................... 99/330 |
| 5,957,274 * | 9/1999 | Dobie et al. .................... 219/681 |

FOREIGN PATENT DOCUMENTS

| | | |
|---|---|---|
| 2 248 640 | 4/1974 | (DE) . |
| 42 31 897 | 3/1994 | (DE) . |
| 0 501 159 | 9/1992 | (EP) . |
| 2 587 464 | 3/1987 | (FR) . |
| 1 254 931 | 11/1971 | (GB) . |
| 56-134962 | 10/1981 | (JP) . |
| 6-194943 | 7/1994 | (JP) . |
| 7-124388 | 5/1995 | (JP) . |
| 81-78522 | 7/1996 | (JP) . |
| 94/19656 | 9/1994 | (WO) . |
| WO95/33169 | 12/1995 | (WO) . |

* cited by examiner

Primary Examiner—Stephen Gravini
(74) Attorney, Agent, or Firm—Burns, Doane, Swecker & Mathis, L.L.P.

(57) ABSTRACT

A dehydration plant for dehydrating food products, including a microwave kiln (2), conveyor means (3) for conveying food products through the kiln (2), circulation means (21, 6) for circulating air through the kiln (2), refrigerated dehumidification means (7, 11) for dehumidifying the air to be circulated through the kiln (2), and heating means (12, 13, 14) for heating the air to be circulated through the kiln (2) such that food products conveyed through the kiln (2) are exposed to both microwave emissions and the flow of dehumidified heated air to thereby dehydrate the food products.

29 Claims, 13 Drawing Sheets

DEHYDRATION PLANT

The present invention is generally directed to the dehydration of food products and in particular, is directed to dehydration plants for this purpose.

Dehydration is a well known method of preserving food products. During the dehydration process the water content of the food product being dehydrated is reduced to make the food product unsuited to the growth of spoilage organisms. It has been found from extensive scientific tests upon different food preservation methods that the nutritional contents of food is least affected by appropriate dehydration. Furthermore, the economics of transporting food products such as manufactured meats can be greatly improved by dehydrating these foods to a dried form at their point of production and on shipping. Under these circumstances, savings on both weight and bulk of up to 70 percent can be achieved together with dispensing with the need for refrigeration, an aspect important to developing countries.

Two methods are currently used for drying food products;
  a) heat applications to remove water; and
  b) freeze drying procedures.

Solar dehydration is not suited to mass production in Western countries due to high labour requirements and poor hygiene control. Oven drying is therefore at present the most widely used method of commercial dehydration and involves exposure of the food product to dry, heated air. Many food products are now dried by placing them into a chamber where heat is applied by either gas or electricity. Water in the food product is heated until "boiled off to become dry. This normally occurs at high temperatures and is sensitive to both atmospheric humidity plus ambient temperature. Pre-cooking before dehydration results in a more acceptable product than dehydrating from the raw state.

Freeze drying, also known as "lyophilisation" involves first freezing the food product then directly sublimating ice from frozen to the gaseous state by severe decompression. Flavour changes are minimal, product shrinkage is negligible and the dried material is porous and readily re-hydrated.

Disadvantages of the established dehydration plants includes the high capital costs in setting up and running of such plants, particularly in the case of freeze drying plants. Furthermore, the food product and its taste can be degraded by excessive heating. In particular, freezing can result in changes in the food texture which results in a textural defect known as "woodiness".

Furthermore, dehydration plants using either oven drying or freeze drying generally involve batch processing of the food product. Also, environmental waste problems are created by the use of such dehydration plants.

It is therefore an object of the present invention to provide a dehydration plant which overcomes at least one of the above noted problems.

With this in mind, and according to one aspect of the invention herewith, there is provided a dehydration plant for dehydrating food products including:
  (a) a microwave kiln;
  (b) conveyor means for conveying food products through the kiln;
  (c) circulation means for circulating air through the kiln;
  (d) refrigerated dehumidification means for dehumidifying the air to be circulated through the kiln; and
  (e) heating means for heating the air to be circulated through the kiln; such that food products conveyed through the kiln are exposed to both microwave emissions and the flow of dehumidified heated air to thereby dehydrate the food products.

The dehydration plant may be accommodated within an enclosure, which may be transportable as a fully self contained unit to thereby facilitate installation of this dehydration plant. The enclosure may for example be in the form of a standardised industrial freight container.

The microwave kiln may include a kiln tunnel through which food products can be conveyed. The kiln tunnel includes microwave emission means for exposing the food products conveyed through the kiln tunnel with microwaves. The microwave emission means may include a plurality of microwave emitter horns spaced in the elongate direction of the kiln tunnel. Microwave reflection means may be provided for each emitter horn.

The conveyor means for conveying food products through the kiln tunnel may include at least one conveyor belt arrangement extending through the kiln tunnel. The conveyor belt arrangement may preferably include a plurality of conveyor segments. Each conveyor segment may have a forward upstream end and a rear downstream end and may be located on an incline such that the rear end of the conveyor segment is higher than the forward end thereof. The conveyor segments may be positioned such that the trailing rear end of one conveyor segment may be located above the front end of the next adjacent conveyor segment. This overlapping arrangement of the conveyor segments allows for the food products carried by the conveyor means to "cascade" from one conveyor segment to the next adjacent conveyor segment. The conveyor means may also include an intake conveyor provided upstream of the conveyor segments for carrying food product into the microwave kiln tunnel, and a discharge conveyor provided downstream of the conveyor segments for carrying food product out of the microwave kiln. Both the intake and discharge conveyors may be extendible from and retractable into the plant enclosure.

Each conveyor segment may include a conveyor belt supported on and moveable about a front and rear conveyor drum. The conveyor belt may be formed of a plurality of chain links. The chain links may be connected by tie rods and positioned to thereby provide openings through the conveyor belt. As the conveyor belt is exposed to microwaves, each chain link may for example be made of a bipolar or low loss dielectric plastic and the tie rods may be formed from nylon or similar dielectric material. Each chain link may include a lateral spike for effecting increased turbulence about the conveyor belt as well as helping to hold the food product on the conveyor belt. Alternatively, the conveyor belt may vary from coarse chain mesh through to a fine gauge chain mail with ultrafine gauge comprising polypropylene woven belt mesh, accordingly best suited to differing produce.

The drive drums of each conveyor segment may be lined with metal such as stainless steel for reflecting microwaves. A microwave reflector dish may be located between the front and rear drive drums of each conveyor segment to provide the lower reflector portion of a microwave oven compartment of the microwave emission means. A corresponding upper reflector dish may be located above and at least substantially parallel to the lower reflector dish of each conveyor segment. Both the upper and lower reflector dishes may be made of metal such as stainless steel. A plastic cover may be provided over the lower reflector dish to prevent food product falling into the dish. The cover may include along the forward upstream edge thereof an extendable edge lip which may act as an air deflector. The edge lip deflector may further include a row of nylon prongs for underside engaging and effecting ratchet agitation of the conveyor chain-mesh progression. Other conveyor agitation mechanisms are also envisaged. A plastic cover may also be provided over the upper reflector dish. The lower and upper plastic covers therefore provide a narrow processing passage through which the heated dehumidified air can pass therethrough together with the conveyed and agitated food product.

At least one said microwave emitter means may be located within each upper reflector dish. At least one microwave deflector fan may also be located within each upper reflector dish. Each deflector fan may include metal deflector paddles which act as mode stirrers to more evenly disperse the microwave emissions from the emitter horn and reflected from the upper and lower reflector dishes.

Side plates may be provided on either side of each conveyor segment. Each side plate may be coupled to the lower reflector dish such that the conveyor segment can provide an assembly for supporting the conveyor drums and belt to thereby provide a unit which may be readily removable from the kiln tunnel. To this end, the rear drive drum may be driven by means of a drive axle which may be readily de-coupled from the drive drum to facilitate removal of the conveyor segment as required.

The arrangement of the conveyor segments promotes both phased microwave exposure and cascading of the food product between adjacent conveyor segments thereby maximising exposure of the food product to the dehumidified heated air within the kiln tunnel. The flow of air can be partly redirected by the air deflector provided along the forward edge of the cover of the lower reflector dish and which may also effect conveyor agitation. Furthermore, the deflected air can flow upwardly from underneath the cascading and agitated food product to thereby provide a semi-fluidised oven bed arrangement. This thereby amplifies the exposure of the food product to the dehumidified heated air. Furthermore, the food product is simultaneously exposed to intermittent microwave exposure while being conveyed and agitated through the kiln tunnel.

The circulation means for circulating air through the kiln tunnel may also recirculate at least a significant portion of the air within the enclosure to thereby achieve greater plant efficiencies. To this end, the enclosure may also include insulated and proofed walls to minimise heat loss therefrom and facilitate wash-down/cleaning.

The circulation means may include an air circulation duct and a fan located within the air duct for drawing air into the enclosure. The air may be drawn through a filter arrangement. The fan may also recirculate air through the dehydration plant.

The refrigerated dehumidification means and the heating means may be located within the air duct downstream of the circulation fan. Evaporator coils of the refrigerated dehumidification means may be provided immediately downstream of the circulation fan for cooling and therefore dehumidifying the air. Condensate removed from the air being cooled may be collected to provide a further product from the dehydration unit. A heat exchanger may be provided downstream of the evaporator coils for adding heat to the cooled air. This heat may be supplied by a further heat exchanger provided upstream of the circulation fan. This further heat exchanger may absorb heat and arrest greases from the air exiting the kiln tunnel. This arrangement helps to minimise heat loss from the dehydration unit and may take the form of a 'heat pipe' arrangement.

Condenser coils of the refrigerated dehumidification means may be located downstream of the heat exchanger to further heat the air passing therethrough. Heater coils may also be provided downstream of the condenser coils to provide any further heating of the air as required prior to circulation into the kiln tunnel. These heater coils may for example use steam to provide the heating.

A food pretreatment zone may be provided above the intake conveyor for preheating and bacterial control of the food product upstream of the microwave emission means. This pretreatment may be achieved by first passing food products through fields of infra-red and ultra-violet radiation.

A mixing vane may be provided immediately downstream of the further heat exchanger/arrester for controlling the amount of air recirculated through the dehydration unit. The mixing vane may control the amount of air recirculating back through the air duct and the amount of air being exhausted. The exhausted air may pass through a bio vent exhaust to minimise the amount of environment emissions from the dehydration unit. A further condenser for the refrigerated dehumidification means may be provided upstream of the bio vent exhaust to provide a heat sink therefor. It is also envisaged that this heat sink may provide heat to the food preheater.

According to another aspect of the present invention, there is provided a method of operating a dehydration plant for dehydrating food products, the method including:
  (a) conveying a said food product through the microwave kiln;
  (b) dehumidifying and heating air within the plant; and
  (c) circulating the dehumidified heated air through the microwave kiln, such that the food product is exposed to both microwave emissions and the flow of dehumidified heated air within the microwave kiln.

The food product may be cascaded over at least one drop within the microwave kiln to thereby maximise the exposure of the food product to the flow of dehumidified heated air.

The method may also include collecting the heat of the air that has passed through the microwave kiln and supplying said collected heat to the air upstream of the microwave kiln.

The method may further include preheating the food product upstream of the microwave kiln. The food product may also or alternatively be exposed to ultra-violet radiation for bacterial control purposes.

A single dehydration unit may be used to provide a predetermined amount of dehydration, for example 20 to 25% moisture retention. If greater dehydration levels are required, then the dehydration units can be used in series to provide greater dehydration, for example, 4 to 6% moisture retention, with the second unit adopting a "counter" ventilated configuration, with the air being circulated in an opposing direction to the first unit, if so desired.

The dehydration unit of the present invention therefore uses the technologies of refrigerated dehumidification assisted by radio frequency microwaves to compliment industrial oven drying. The dehydration plant of the present invention may also provide a totally closed system to avoid or minimise adverse environmental emissions as well as to ensure that the dehydration plant can be fully commissioned off site and can be readily transported to and installed on site. This facilitates installation and ensures that the equipment meets safety regulations. Furthermore, the dehydration plant of the present invention can also provide for a continuous process unlike conventional drying ovens and is not limited to batch processing.

During passage of food product through the microwave kiln, the consequential molecular excitement of polarity by microwaves induces 'sensible' and 'latent' heat therein and in turn, creates 'pressure differentials'. These 'pressure differentials' effectively "pump" residue moisture to the surface of the food product being dehydrated where it is evaporated or "washed" away by large volumes of cool dry air. Concurrently, the microwave 'volumetric' heat generation from the food product may be collected and passed forward to aid the preliminary drying of the food product as well as counter 'latent' heat loss from the evaporative moisture removal.

Because the dehydration is attained at relatively low temperatures, this ensures essential product characteristics such as colour, taste, protein levels plus texture are retained to thereby provide prime quality products at high volume.

The net result is that the dehydration plant of the present invention provided significantly greater drying rates yet consumes less energy for superior dehydration as compared to other dehydration systems. Effectively, only one sixth of the energy used in conventional drying is necessary in the dehydration unit of the present invention. The addition of microwave technology accelerates the extraction rate of moisture resulting in a threefold increase in actual throughput.

It will be convenient to further describe the present invention with respect to the accompanying drawings which illustrate a possible arrangement of the invention. Other arrangements of the invention are possible and consequently, the particularity of the accompanying drawings is not to be understood as superseding the generality of the preceding description of the invention in the drawings.

Figure 1:
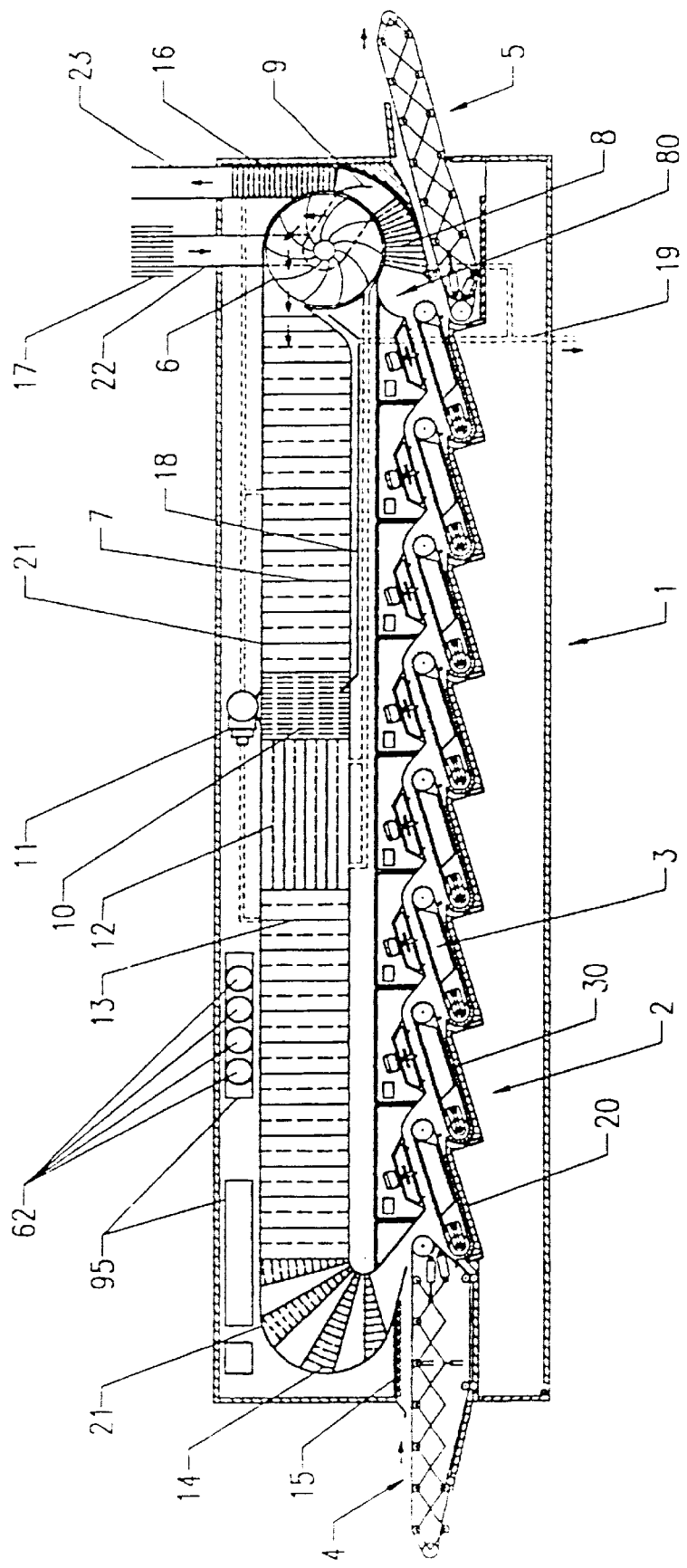
FIG. 1 is a schematic side view of a preferred arrangement of a dehydration unit according to the present invention.

Referring initially to FIG. 1, the dehydration unit of the present invention includes an enclosure 1 which can for example be in the form of a standard refrigerated ISD container. The self-contained dehydration unit includes a microwave kiln 2 and a conveyor assembly 3 for conveying food product through the microwave kiln 2 as well as on board operating plant compartments 95.

Figure 2:
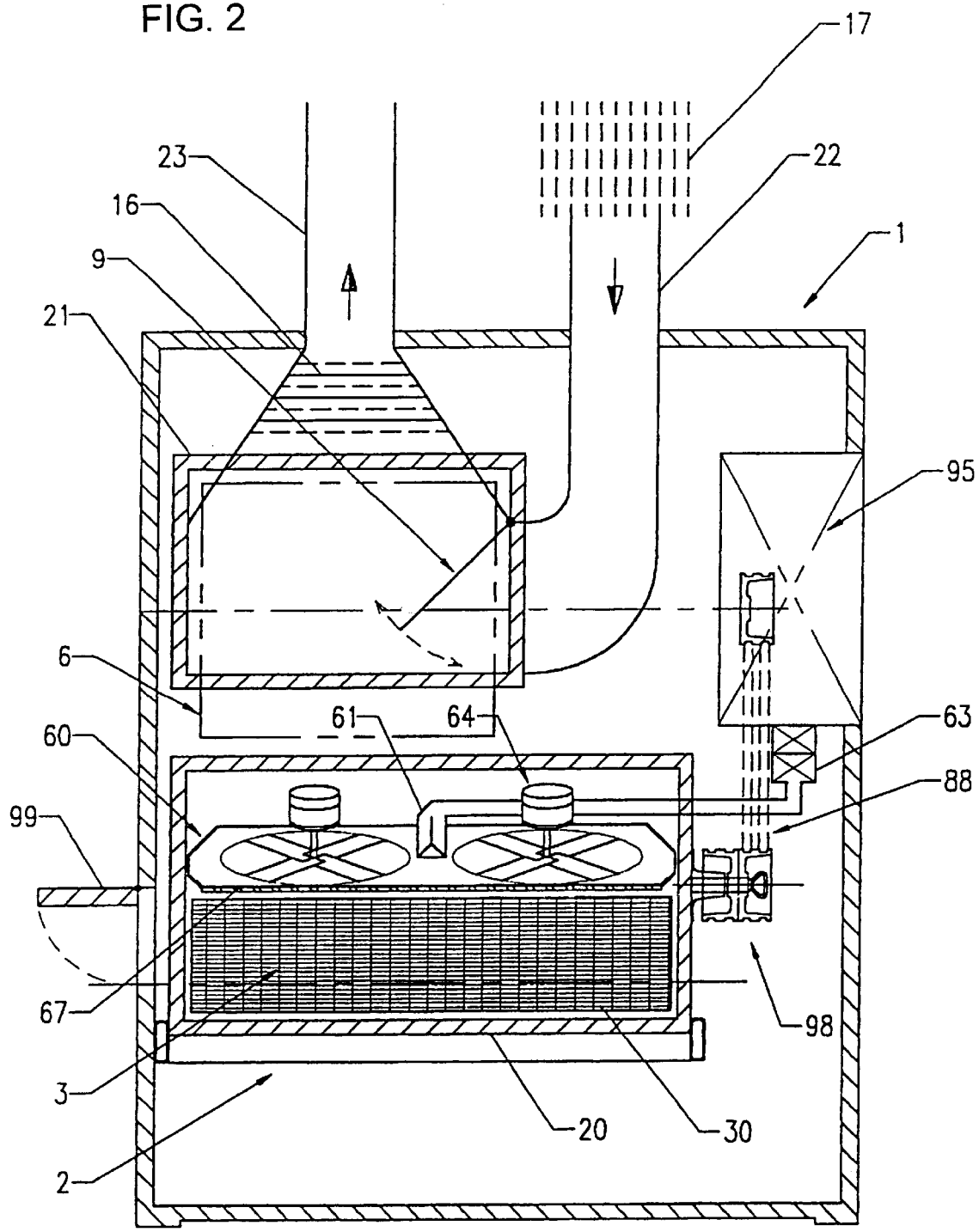
FIG. 2 is an end view of the dehydration unit of FIG. 1.

Referring to FIG. 2, the components of the microwave kiln are located within an elongate kiln tunnel 20. Dehumidified heated air is supplied to this kiln tunnel 20 by a circulation means which includes an air duct 21 located above the kiln tunnel 20 and a fan 6 for supplying air to the air duct 21. The air duct 21 supports a refrigerated dehumidification means for dehumidifying the air passing through the air duct 21 and heater means for heating the air passing through said duct 21 and may collectively act as a 'heat-pump' arrangement.

The refrigerated dehumidification means is in the form of a vapour compression system including evaporator coils 7, a compressor(s) 11 for compressing the coolant within the system, and condenser coils 13 for condensing the coolant. The evaporator coils 7 are located downstream of the fan 6 for cooling and therefore dehumidifying the air passing therethrough. Condensation from the evaporator coils 7 may be collected in a condensate pan 18. The collected condensate 19 can be collected and sold as distilled water. A dry pad air filter 10 is provided downstream of the evaporator coils 7 to provide final filtering of the air. The air then passes through a heat output exchanger 12 providing a heat input into the air passing therethrough. The heat provided by the heat output exchanger 12 is collected by a heat intake exchanger 8 located in the exiting exhaust stream of dehumidified heated air that has passed through the microwave kiln tunnel 20. This arrangement improves the overall energy efficiency of the dehydration unit by minimising the heat loss from the dehydration unit and may take on a 'heat-pipe' arrangement. The heat intake exchange coils 8 may further double as an exhaust condensate grease arrester, with ease of removal for cleaning.

The condenser coils 13 are located downstream of the heat output exchanger 12 to provide further heat input into the air passing therethrough. Finally, heater coils 14 may be provided downstream of the condenser coils 13 to provide the final heat input into the dehumidified air prior to circulation into the microwave kiln 2. The heater coils 14 may for example be supplied by steam from an outside source to provide the necessary heat input into the air. Other heater arrangements are also envisaged.

To further maximise the energy efficiency of the dehydration unit, at least a portion of the heated dehumidified air can be recycled through the air duct 21. An adjustable mixing vane 9 is located downstream of the heat intake exchanger 8 and controls the amount of air recycled back to the fan 6 or allowed to exit through an exhaust pipe 23. Any excess heat from the vapour compression system may be removed by means of a condenser heat sink 16 located within the exhaust pipe 23. Fresh air can also be drawn by the fan 6 through an intake pipe 22, with an intake air filter 17 being provided at the upper end of the intake pipe 22.

The conveyor assembly 3 includes an intake conveyor 4 and a discharge conveyor 5. A plurality of conveyor segment assemblies 30 are provided between the intake conveyor 4 and the discharge conveyor 5. The conveyor segment assemblies 30 are mounted on an incline such that the downstream end of each conveyor segment is located above the upstream front of the next adjacent conveyor segment 30. This overlapping arrangement allows for cascading of the food product from one conveyor segment 30 to the next through the microwave kiln tunnel 20.

The food product being carried into the dehydration unit by the intake conveyor 4 is initially passed through pretreatment means 15 located above the intake conveyor 4 to expose the food products to fields of infra-red and ultra-violet radiation to effect preheating and bacterial control. Both sources of radiation may be independently controlled with the product thereby preheated to working temperatures while the ultra-violet assists with the elimination of unwanted bacteria. It is envisaged that the pretreatment means 15 utilises steam or be in the form of an electrical heating means. Alternatively, the plant "heat sink" 16 could provide a pre-heating means for the food product.

Figure 3:
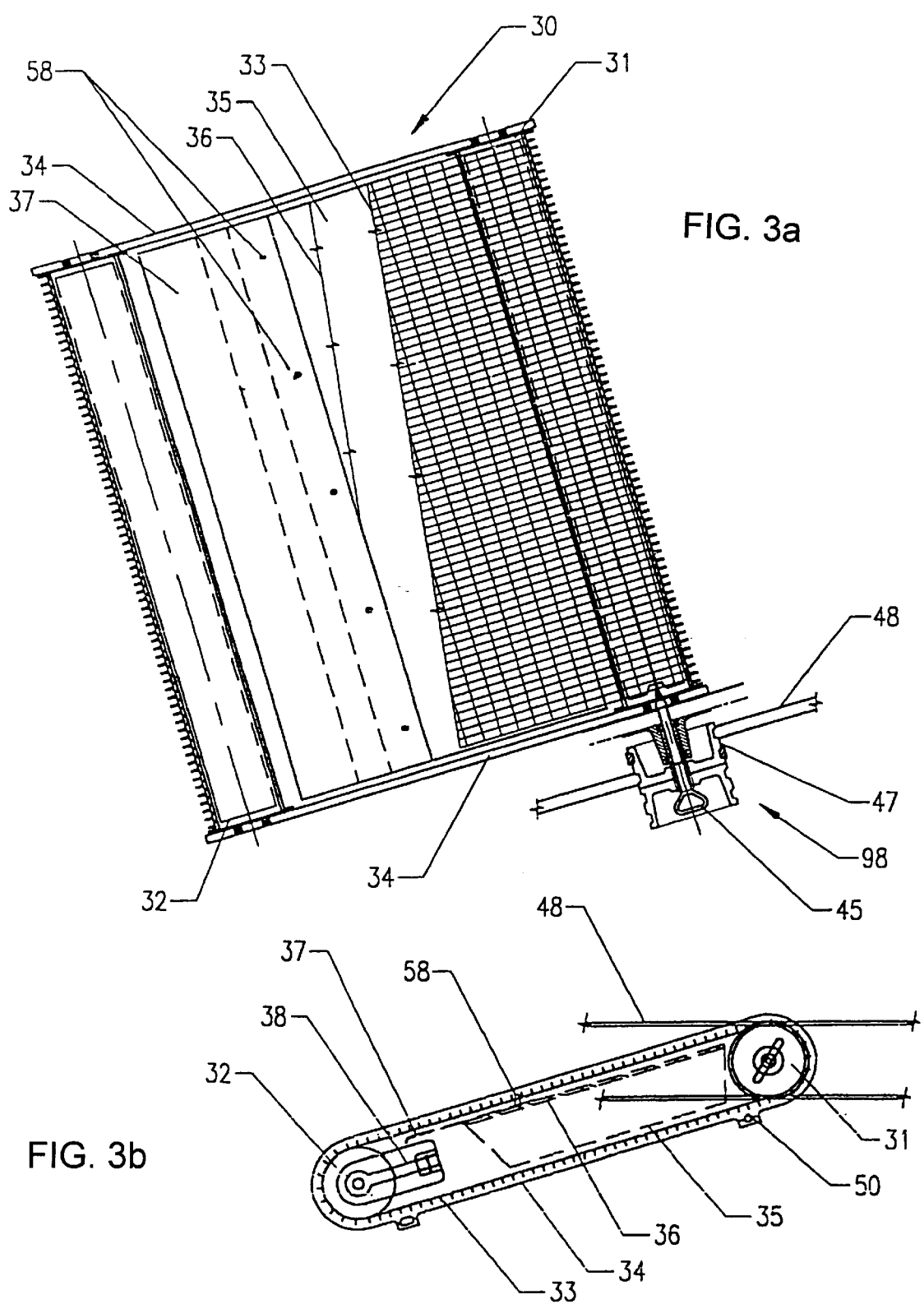
FIG. 3a and 3b are respectively top and side views of a conveyor segment of the dehydration unit according to the present invention.

Referring to FIGS. 3a and 3b, each conveyor segment assembly 30 includes a rear drive drum 31, and a front support drum 32 for supporting a conveyor belt 33 thereon. Side plates 34 are provided on each side of the assembly 30. A stainless steel reflector dish 35 is located between the rear drive drum 31 and the front support drum 32 and is secured to each side plate 34 to thereby hold the assembly 30 together as a unit. The reflector dish 35 provides the lower reflector for a microwave oven compartment within the microwave kiln 2.

A plastic cover 36 is provided over the lower reflector 35 for restricting the flow of air through the kiln tunnel 20 over the surface of the conveyor belt 33 as well as for preventing food products falling into the lower reflector 35. An extendable edge lip 37 is provided on the front upstream end of the plastic cover 36. This edge lip 37 acts as an adjustable air deflector. The edge lip deflector 37 may further include a row of flexible nylon prongs 58 with inclination setting bar to vary the underside engagement and agitation of the chain-mesh conveyor belt 33 upon progression. Alternatively, finer mesh conveyor agitation may be achieved through underside beating effected by a vertically oscillating, horizontal rod having end lugs engaging slotted sprockets revolved by geared pulleys driven off the conveyor progression.

The front support drum 32 in turn, is supported by an adjustable conveyor belt tensioner arrangement 38 to thereby control the tension of the conveyor belt 33.

Figure 4:
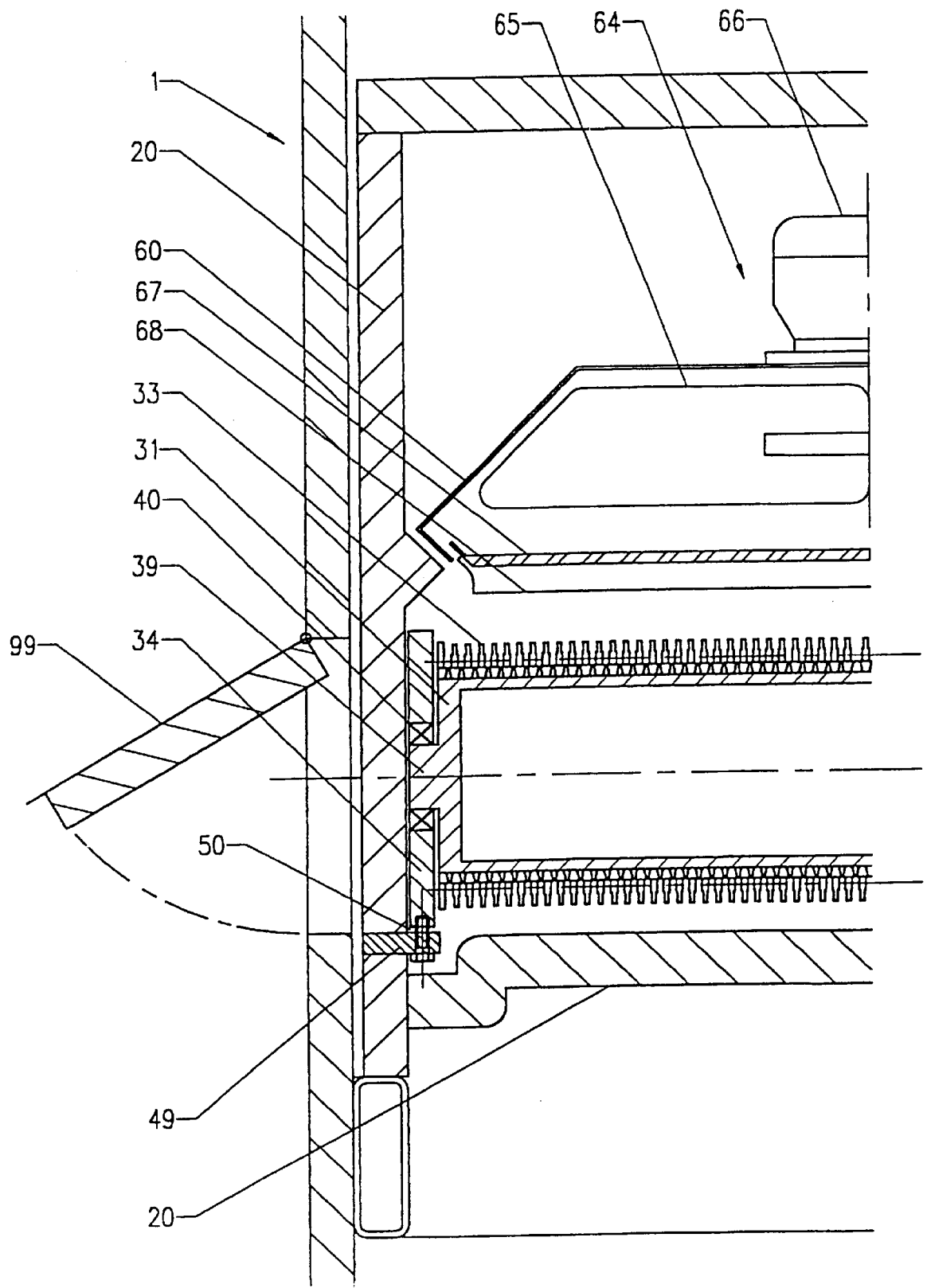
FIGS. 4 and 5 are detailed views of the support arrangement of the drive drum of the conveyor segment of FIGS. 3a and 3b.

The rear drive drum 31, as shown in FIG. 4, has a stub axle 39 extending from one end thereof which is accommodated within a bearing 40 provided in the adjacent side plate 34. Inspection hatches 99 are provided within the side of the enclosure 1 to allow inspection of the interior of the microwave kiln 2.

Figure 5:
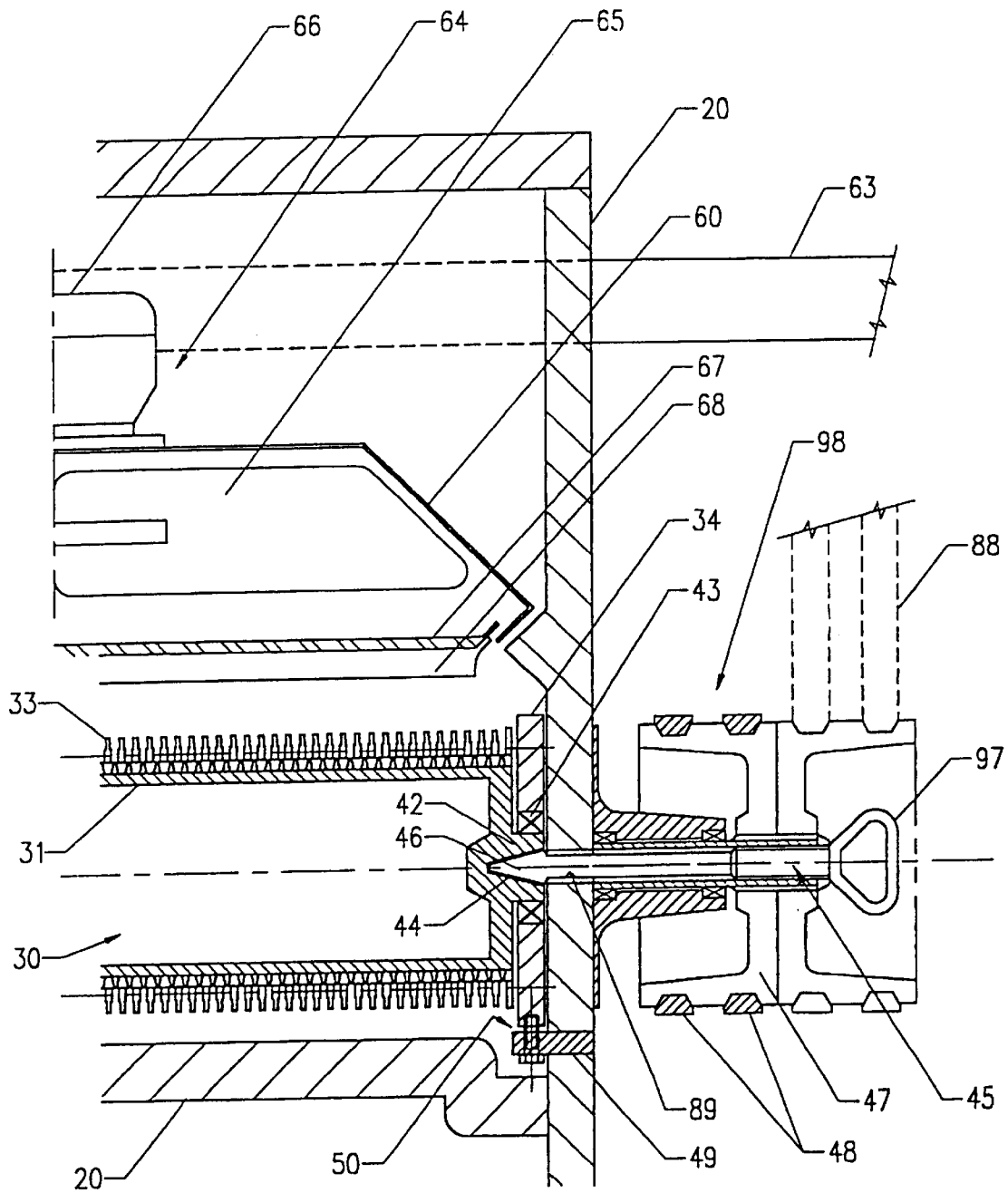
Figure 9:
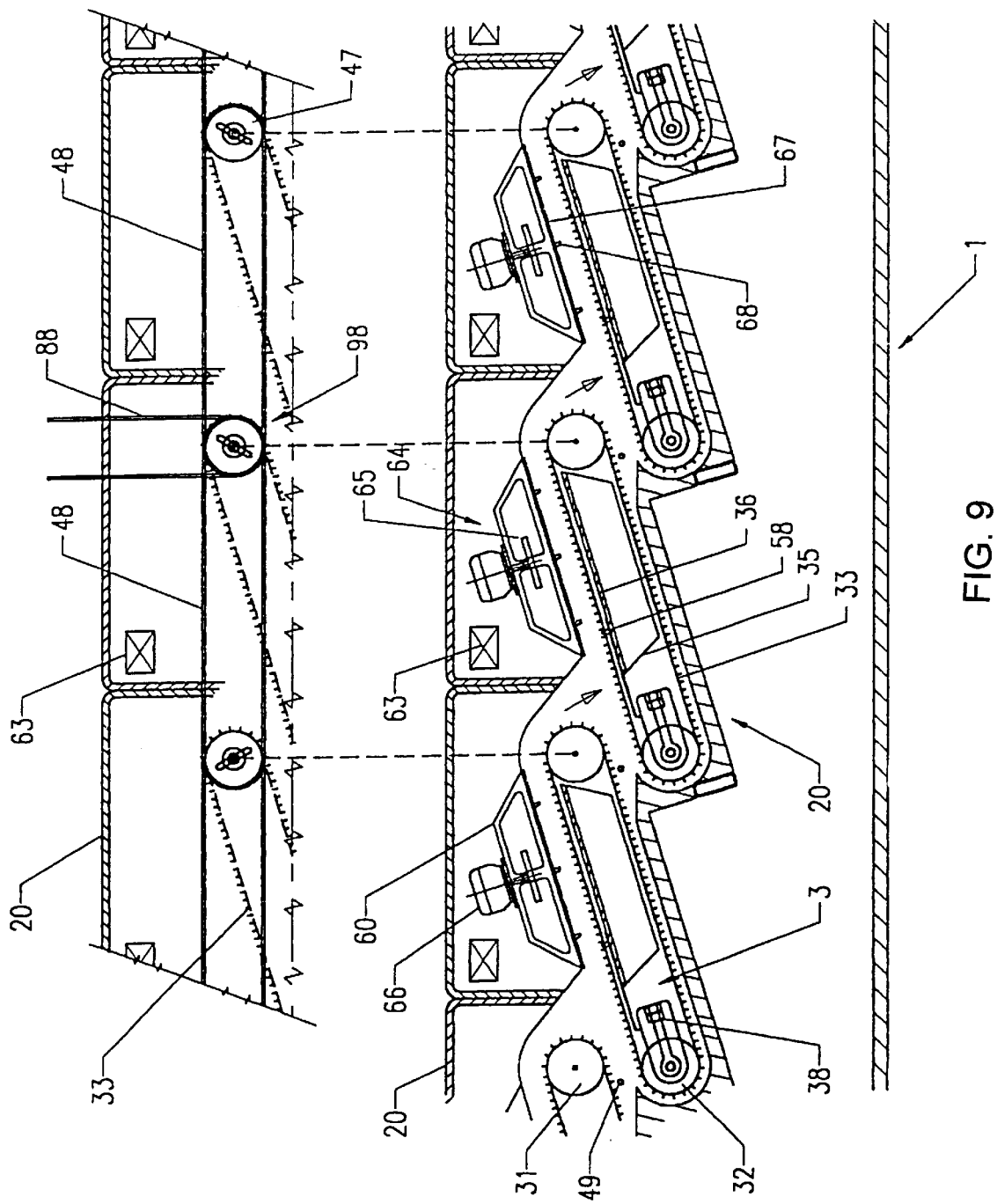
FIG. 9 is a detailed side view of the microwave kiln and conveyor drive arrangement of the dehydration unit of FIG. 1.

The other end of the drive drum 31, as shown in FIG. 5, also includes a stub axle 42 supported within a cooperating bore 43 of the adjacent side plate 34. This stub axle 42 further includes a cavity 44 for accommodating the head 46 of a drive key 45. The drive key 45 couples the drive drum 31 to a drive pulley 47 of a belt drive assembly 98. The pulley 47 may both drive and be driven by duplicate drive belts 48 coupling and propelling adjacent kiln pulleys to collectively constitute a drive assembly 98 for synchronising all conveyor segments 30 including feed conveyors 4 and 5 of the Dehydration Plant. In turn, the drive assembly or 'drive-train' may be driven by solitary drive belt 88 and motor in conventional and regulated manner as shown in FIG. 9. The drive key 45 may be retractable by pulling a handle 97 thereof such that the drive key head 46 can disengage the drive drum 31. The shank of each drive key 45 may contain a 'break-point' nitch 89 as overload safeguard feature for the conveyor mechanism. The conveyor segment assembly 30 is also supported by a fixing lug 49 extending from the wall of the kiln tunnel 20 into a cooperating aperture 50 within the side plate 34 thereof. This arrangement allows for ready removal of each conveyor segment for maintenance or other reasons.

Figure 6:
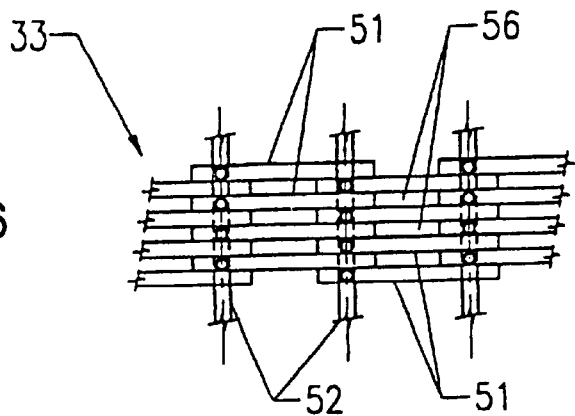
FIGS. 6 to 8 are detailed views of the conveyor belt for the conveyor segment of FIGS. 3a and 3b.
Figure 7:
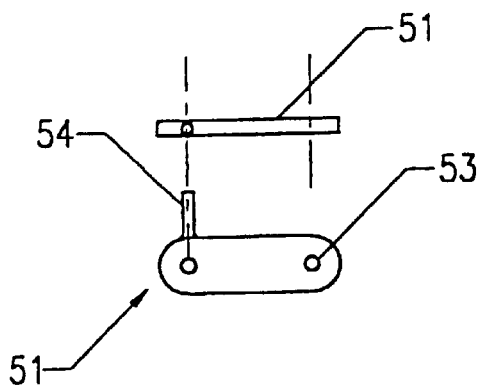

FIG. 6 is a plan view of the conveyor belt 33 which includes a plurality of chain links 51 as shown in detail in FIG. 7. The chain links 51 are held together by means of tie rods 52 extending through apertures 53 in each chain link 51. A holding spike 54 may extend from each chain link 51 to hold the food product on the conveyor belt 33 while at the same time inducing increased turbulence of the air passing through the kiln tunnel 20. Alternatively, utilisation of a proprietary conveyor belt system of equivalent configuration and specification may be envisaged.

Figure 8:
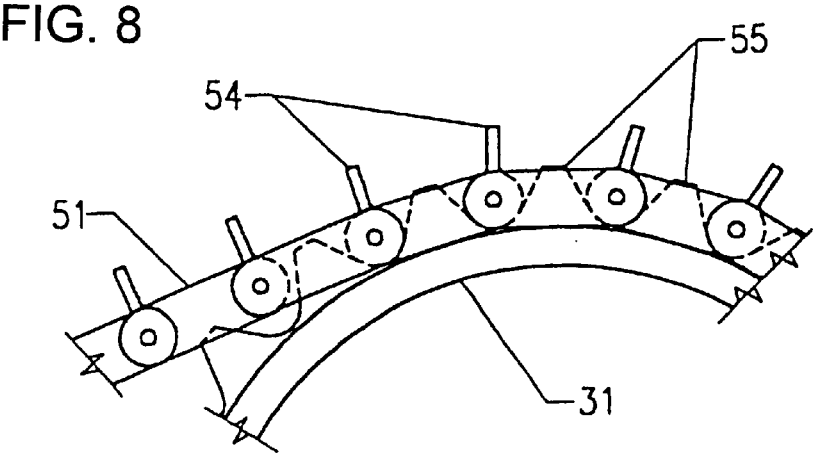

As shown in FIG. 8, the drive drum 31 includes drive teeth 55 extending therefrom for engaging the conveyor belt 33. The drive teeth 55 cooperate with the apertures 56 provided within the conveyor belt 33 between the chain links 51 to push out any food product which may have accumulated within the conveyor belt cavities 56.

Figure 10:
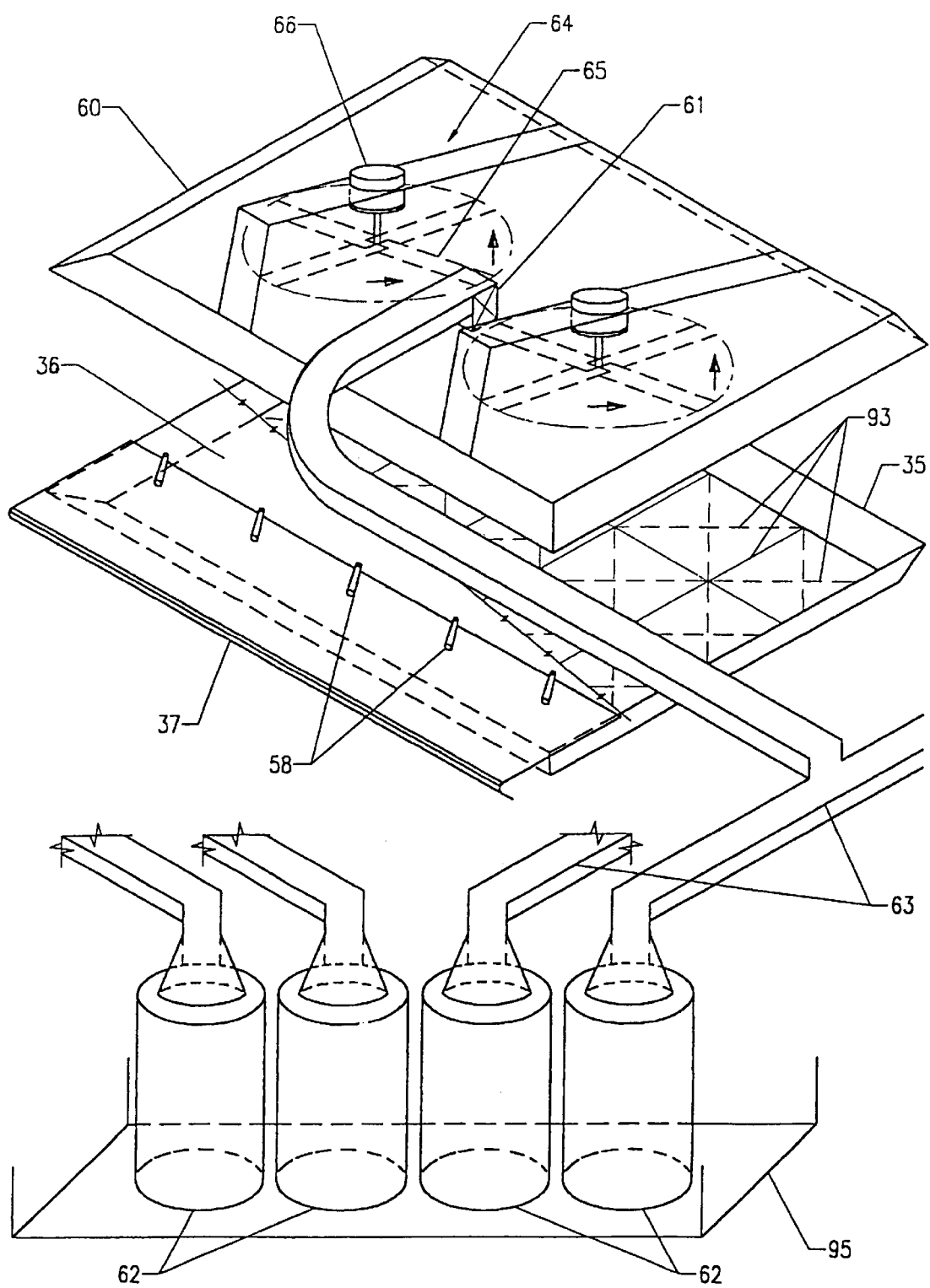
FIG. 10 is a detailed perspective view of the microwave oven compartments of the microwave kiln of FIG. 9.

FIGS. 9 and 10 show in more detail the components of the microwave emission means of the microwave kiln 2. As noted above, each conveyor segment 30 includes the lower microwave reflector dish 35 of each microwave oven compartment. An upper reflector dish 60 is located above the lower reflective dish 35 to define the upper and lowered extent of a said microwave compartment. A plastic cover 67 is also provided over the upper reflector dish 60 to thereby provide an upper portion of a constricted air flow passage defined between the upper cover 67 and the lower cover 36. Strengthening ribs 68 may also extend from the upper cover 67 to strengthen the cover. Furthermore, the strengthening ribs 68 also act as baffles to further increase the turbulence within the kiln tunnel 20.

Microwave emitter horns 61 are located under each upper reflector dish 60. The emitter horns 61 are supplied with microwaves from magnetrons 62 via waveguide ducts 63 in a known manner. On either side of the microwave emitter 61 are provided microwave dispersion fans 64 for dispersing and mode stirring microwaves emitted from the microwave emission horns 61 as well as the microwaves reflected by the upper and lower reflector dishes 35, 60. The deflector fans 64 each include reflector paddles 65 which are rotated by an electric motor 66. In addition, the pitch of individual paddle blades 65 may be capable of adjustment and independent settings.

Figure 11:
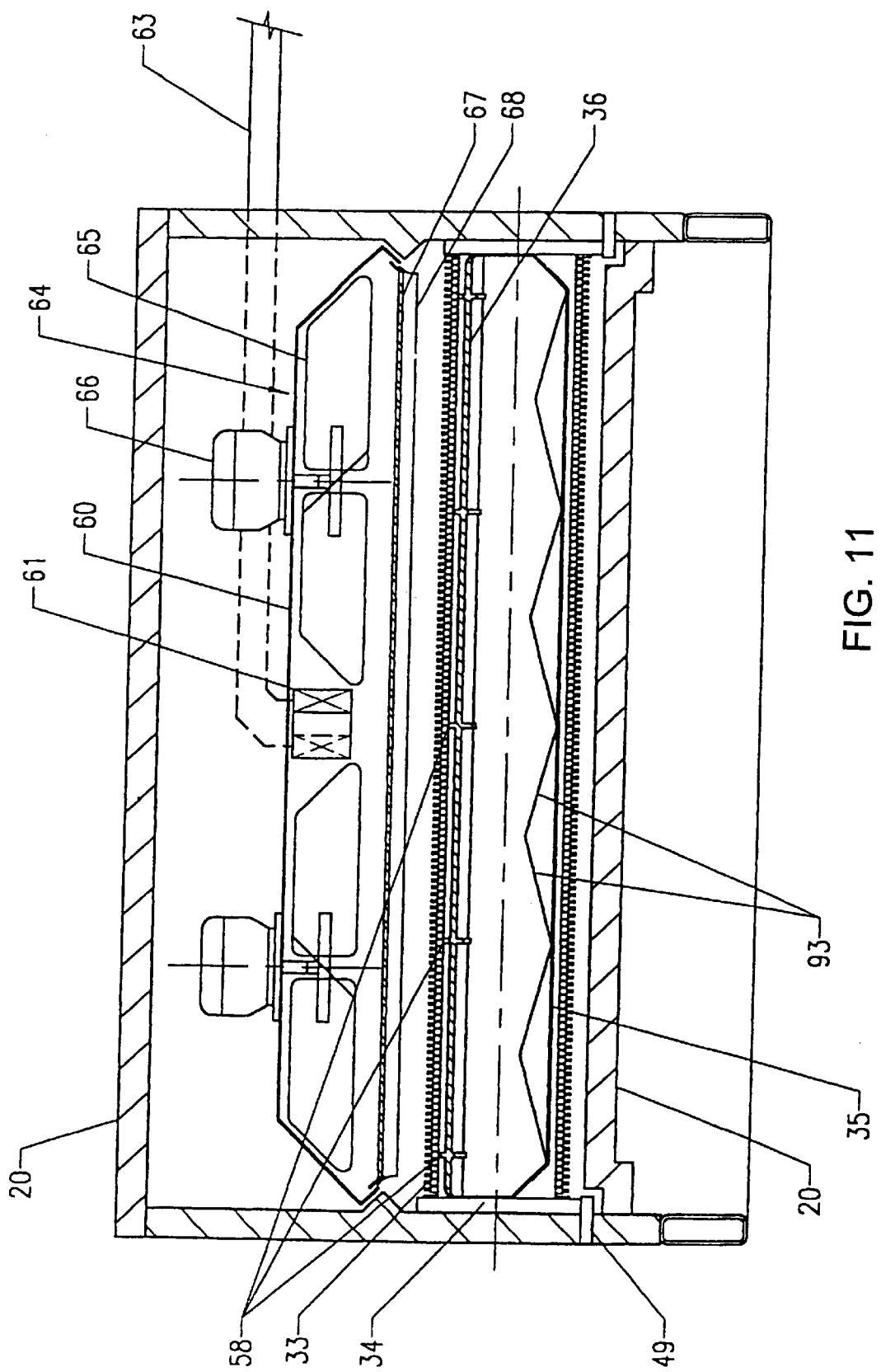
FIG. 11 is a cross-sectional view of the microwave oven compartment of FIG. 10.

Referring to FIG. 11, the respective microwave compartments should be fabricated from non-magnetic materials exhibiting high reflectivity with respect to wavelengths of microwave radiation to be utilised. These compartments adopt known dimensions that enable maximum usage of direct and reflective microwave energy, especially by utilising a geometric shape that promotes as many modes of resonance as possible within the processing zone and across the frequency bands utilised. In particular, the dehydration units seek to provide a resonant oven cavity which, by its particular choice of shape, dimensions and placement of at least one microwave source 61 thereby provides more efficient microwave drying/heating through greater numbers of modes within the useable processing zone. The resonant cavity shape, allowing for paddle deflections, is designed so that waves emitted from any microwave source 61 are not reflected to the same or any other microwave source 61 except after many multiple reflections from the walls of the compartment with (a) consequential passage through the load material travelling through the cavity, and (b) cross coupling to resonant modes of the cavity. This may be achieved by placing said source 61 along a surface which does not directly face any other surface of the cavity i.e, a perpendicular drawn from any point on such a surface does not intersect any other surface of the cavity at right angles. Achieving this geometry results in a condition where no mode can exist between these surfaces and therefore modal energy reflected back to a source mounted on such a surface is minimised with respect to these surfaces. Effectively, the number of direct reflections back to each source (or any other source) can be substantially minimised by careful choice of dimensions which includes considerations for angles of 'attack' and 'sweep' of the deflector paddles and the use of plane wave reflection geometry as will be clear to those skilled in the art.

At least one microwave energy source 61 should emit into each oven cavity comprising at least two substantially parallel and opposing inner surfaces separated from each other by a predetermined distance. This oven compartment configuration, in operation, promotes cross-coupling of microwave energy to produce a processing zone smaller in size than the cavity. This processing zone particularly experiencing a concentration of reflected and resonant mode energy thereby achieving greater concentrations of resonance modes than anywhere else in the chamber. Basically, placement of each of the inner surfaces of the oven compartment is to be carefully selected such that, modes of resonance are maximised within the processing zone, while the number of modes of resonance is minimised at the placement of the microwave source(s). Effectively, the microwave energy emission can be arranged at an antinode of major resonance as occurring between these inner oven surfaces. The base of the lower reflector dish 35 may be indented with a pattern provided by a series of pyramid or suitably shaped indents 93. The purpose of this indented surface is to minimise the possibility of resonance couplings within the microwave emitter horns 61 as well as an enhanced scatter of microwave reflections plus provide greater rigidity to conveyor segment assemblies 30.

Figure 12:
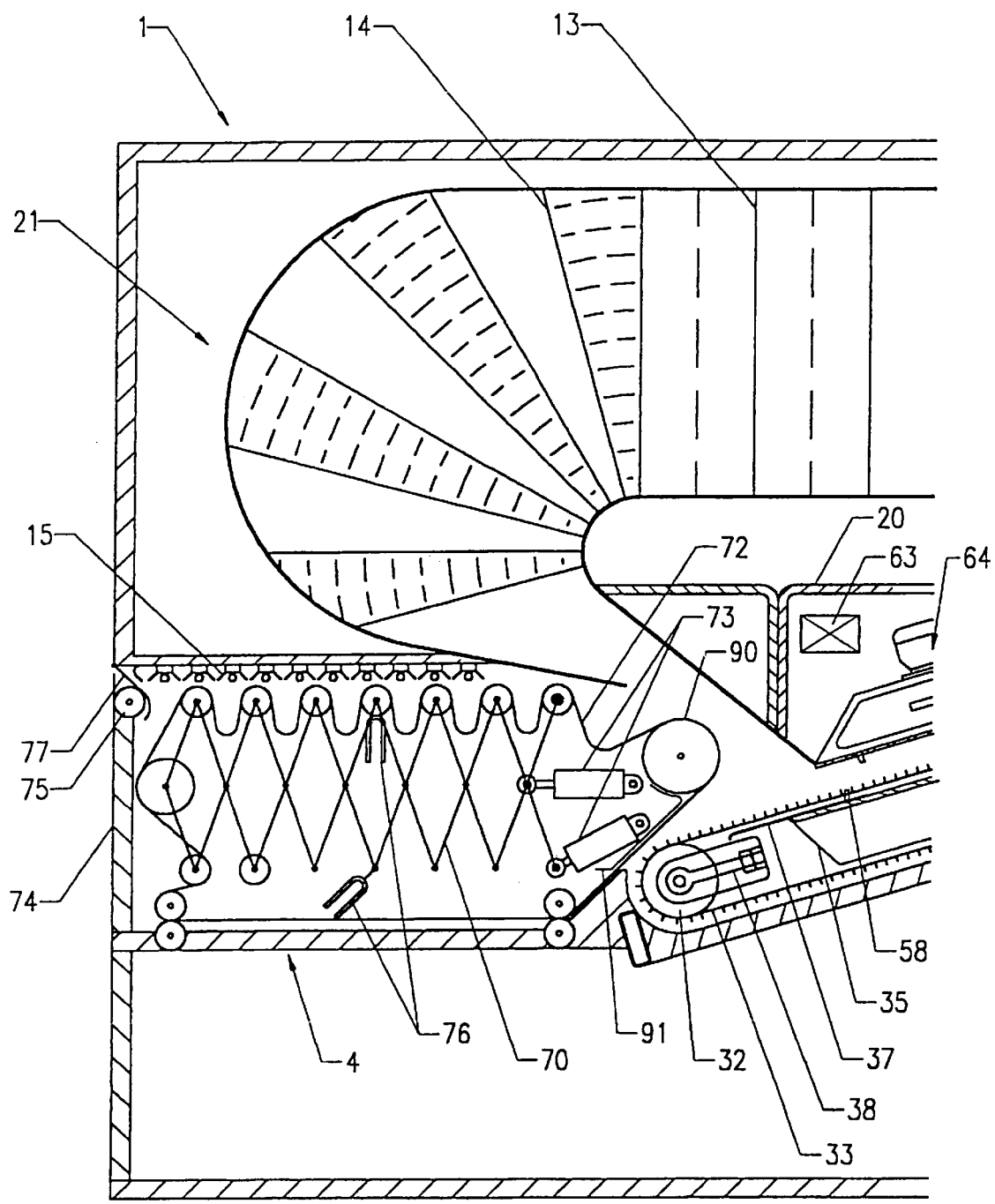
FIGS. 12 and 13 are detailed cross-sectional views of the intake end of the dehydration unit of FIG. 1.
Figure 13:
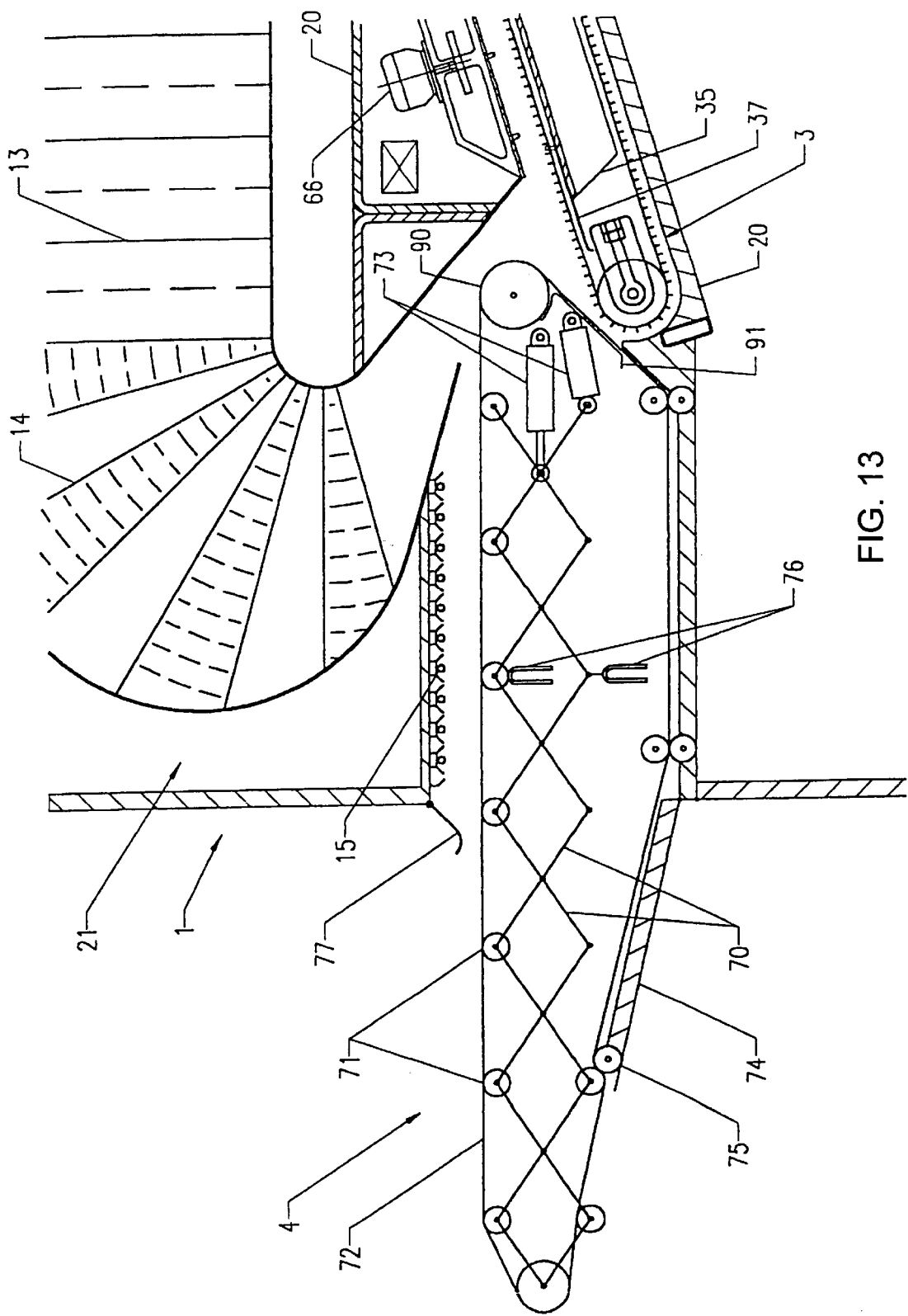

FIG. 12 shows in more detail the components of the dehydration unit at the intake end thereof. The intake conveyor 4 may be provided by a scissors linkage assembly 70 or other suitable telescopic mechanism which allows the intake conveyor 4 to be retracted as shown in FIG. 12 behind a door 74 of the plant enclosure 1 or extended out from the enclosure 1 as shown in FIG. 13. The conveyor includes a series of rollers 71 for supporting the conveyor belt 72. This conveyor belt 72 may be formed from tight woven polypropylene or ultra-violet tolerant Teflon coated Kevlar mesh and is driven by a drive drum 90. Solenoid rams 73 allow the intake conveyor 4 to be retracted and extended as required. To minimise the loss of air from the plant enclosure 1, the feed conveyor drive drum 90 protrudes into the neck of the dehumidified air delivery duct with the resulting restriction inducing 'venturi' air containment from the feed-in aperture as well as increase air velocity to assist clear/blow product delivery into the kiln tunnel. The path of this feed-in conveyor belt further blankets any air escape from the kiln entry 91.

To further enhance hygiene conditions of the enclosure 1, a roller 75 is provided on the peripheral end of the door 74 to engage the bottom of the conveyor belt 72, and a skirting 77 is located above the conveyor 4 as restrictions to the conveyor belt 72 at the intake of conveyor 4. The hygiene skirting 77 may be sprung hinged with semi-circular cross-section and made of stainless steel to provide overhead guttering at the entry and may double as a 'clearance bar' aligned with a conveyor support roller 71 underneath to assist level uneven feeding of produce into the plant enclosure 1 as well as provide additional radiation shielding.

The loss of microwaves from the enclosure 1 is minimised or prevented by means of microwave attenuation spikes 76 extending from the joints of the intake conveyor linkage or telescopic assembly 70 and by reflective metal shields 91 and inner metal linings to the drive drum 90. The metal shielding 91 may double as both feed conveyor guide and assist air containment.

Figure 14:
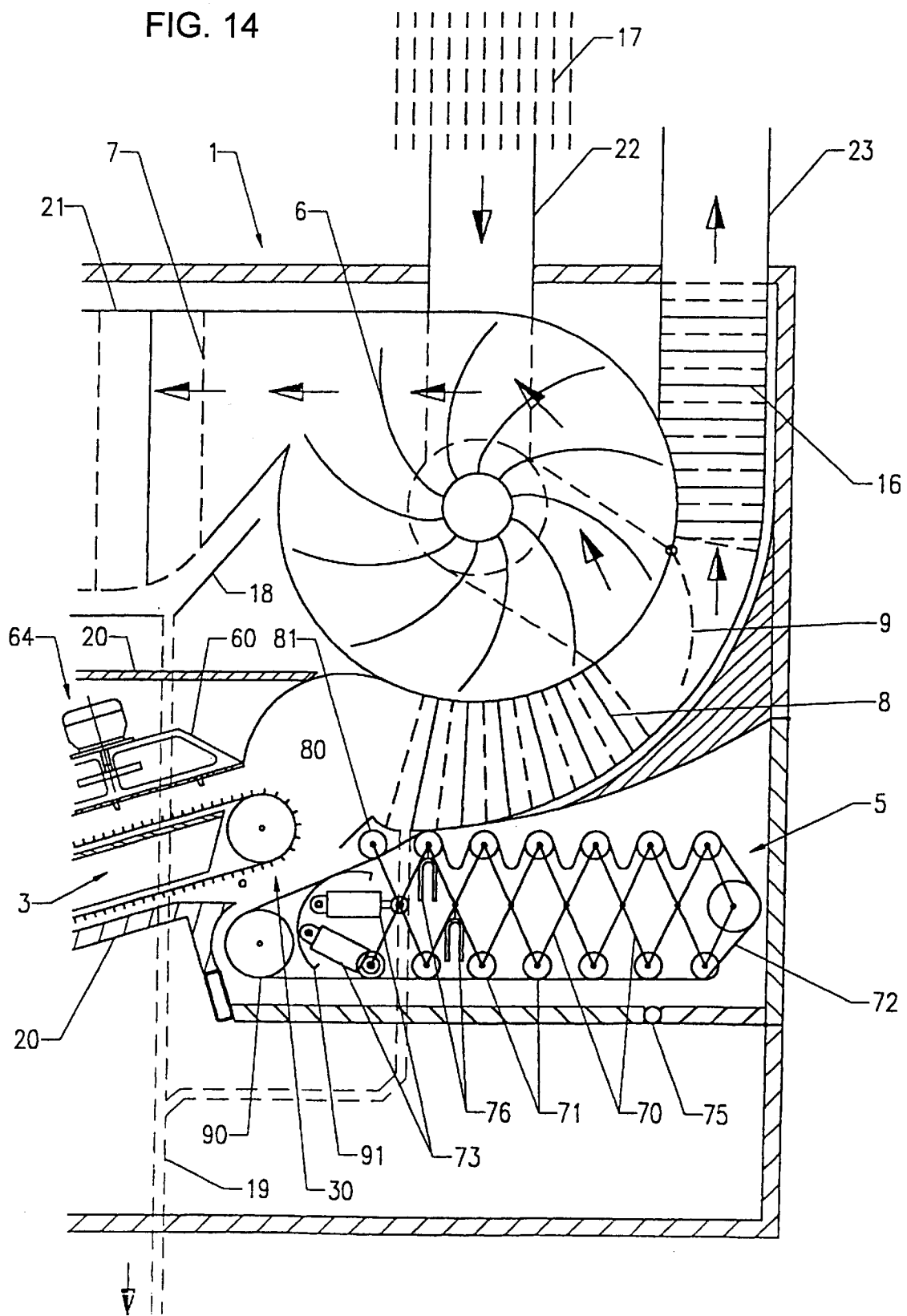
FIGS. 14 and 15 are detailed cross-sectional views of the discharge end of the dehydration unit of FIG. 1.
Figure 15:
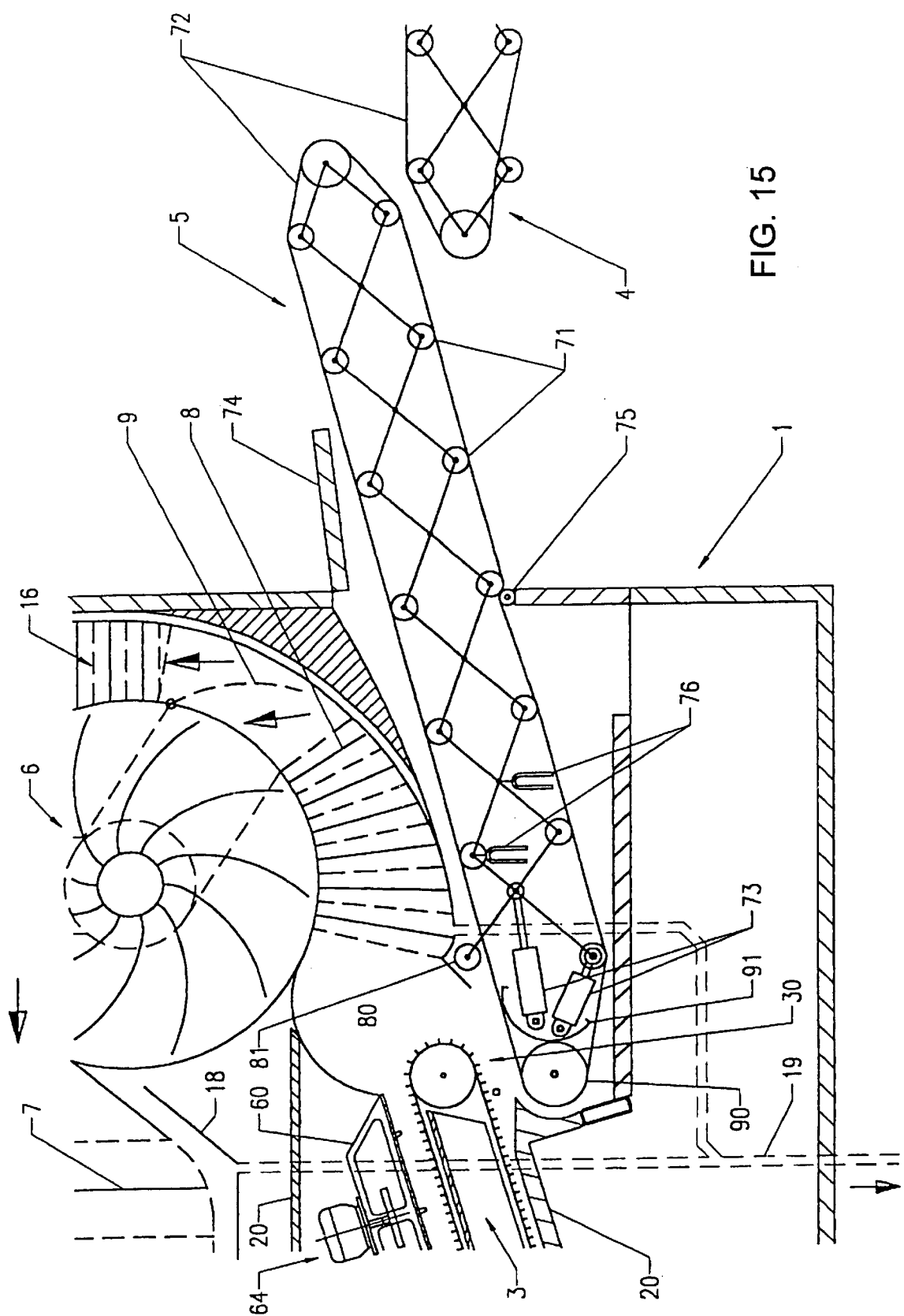

FIGS. 14 and 15 show the components of the dehydration unit at the discharge end thereof. In particular, the discharge conveyor 5 is shown in its retracted position in FIG. 14 and in its extended position in FIG. 15. The components of the discharge conveyor 5 are similar to those of the intake conveyor 4 and will not be described herein.

Immediately downstream from the last conveyor segment assembly 30 is provided an enlarged decompression zone 80 as shown in FIG. 14. At this decompression zone 80, the relatively constricted passage through which the air flows through the microwave kiln 2 expands into the decompression zone 80 thereby reducing the flow velocity of the air. This allows the food product on the last conveyor segment 30 in falling down on to the discharge conveyor 5 and the decompression assisting with kiln air containment. Further air containment is achieved by cross-coupling of the feed-out conveyor belt under support roller 81.

When a plurality of the dehydration plant of the present invention are used in a series arrangement, the discharge conveyor 5 of the first dehydration unit may extend over the intake conveyor of the next adjacent dehydration unit as shown in FIG. 15. This therefore allows the food product to fall off the discharge conveyor 5 straight on to the intake conveyor 4 of the next dehydration unit During operation of the dehydration unit, food product carried on each conveyor segment 30 is exposed to both microwave emissions and heated dehumidified air. As the food product cascades from the downstream end of one conveyor segment assembly 30 on to the next conveyor segment assembly 30, the dehumidified dry air is allowed to flow both under and over the cascading food product to thereby maximise the drying effect. The degree of flow of air from underneath the cascading and subsequently agitated food product can be varied by adjustment of the air deflector 37 and associated agitator mechanism 58 located under the conveyor belt 33 at the front upstream end of each conveyor segment 30. Concurrently, the intermittent microwave exposure helps to effectively draw out water from the heat sensitive food product to thereby maximise this drying.

Heat sensors are used to measure reaction temperatures within kiln processing zones. The feed-back from these sensors allows for the process to be temperature controlled by variations of microwave energy input, the volume and heat of dehumidified air or product feed rates. Furthermore, electrical functions and controls of the relevant technologies to this dehydration process are all computer coordinated and governed to provide a fully automated system which thereby dispenses with significant labour and specialist skills. The program settings will automatically coordinate and control the various technologies to discharge the quality of products stipulated. In effect, the dehydration plant is programmable for a range of products including but not limited to seafoods, meats, offal, fruits, fungii and vegetables.

Consequently, relevant conditions appropriate for removal of moisture from various types of foods to be dried are therefore programmed into the 'on-board' electronic controller of the Dehydration Plant. During the drying process, microwave inputs plus levels of dehumidified air, as well as ambient temperatures as the input parameters including the kiln dwell time are collectively computer controlled using predefined product parameters. More particularly, dehydration plants can be coupled (in series) as staging of these dryers with their governing computers adopting a "master/slave" relationship between coupled units to achieve distinctly differing drying regimes and may entail "counter" ventilating the second unit, where the air is circulated in an opposing direction to the first unit, if so desired, which is considered most effective over the complete, dehydration process.

The claims defining the invention are as follows:

1. A dehydration plant for dehydrating food products, comprising:
   (a) a microwave kiln;
   (b) conveyor means for conveying food products along a conveying path through the kiln, the conveyor means including a plurality of conveyor segments, each said conveyor segment having a forward upstream end and a rear downstream end, the conveyor segments being positioned in an overlapping arrangement such that the rear downstream ends of at least two of said conveyor segments are spaced above the forward upstream ends of the next respective conveyor segments to define vertical drops spaced along the conveying path through which food products fall, (c) circulation means for circulating air through the kiln including the vertical drops;

(d) refrigerated dehumidification means for dehumidifying the air to be circulated through the kiln; and (e) heating means for heating the air to be circulated through the kiln; such that food products conveyed through the kiln are simultaneously exposed to both microwave emissions and the flow of dehumidified heated air to thereby dehydrate the food products.

2. A dehydration plant according to claim 1 wherein each of the conveyor segments is located on an incline such that the rear downstream end is higher than the forward upstream end thereof.

3. A dehydration plant according to claim 1 wherein the conveyor segments convey food products in generally the same direction through the kiln.

4. A dehydration plant according to claim 1 wherein the microwave kiln includes a kiln tunnel through which food products can be conveyed, the kiln tunnel including microwave emission means for exposing food products conveyed therethrough with microwaves.

5. A dehydration plant according to claim 4 wherein the microwave emission means includes a plurality of microwave emitter horns in an elongated direction of the kiln tunnel.

6. A dehydration plant according to claim 1 wherein each said conveyor segment includes a conveyor belt supported on and movable about a front and rear conveyor drum, the conveyor belt being made from a low loss dielectric material and formed of a plurality of chain links interconnect by tie rods to thereby provide openings through the conveyor belt.

7. A dehydration unit according to claim 6 wherein at least a portion of the chain links includes a lateral spike.

8. A dehydration plant according to claim 6 wherein each conveyor segment includes a conveyor belt supported on and movable about a front and rear conveyor drum, the conveyor belt being formed from a mesh material to thereby provide openings through the conveyor belt.

9. A dehydration plant according to claim 7 or 8 wherein a microwave reflector dish is located between the front and rear drive drums of each said conveyor segment, the microwave dish including a cover made of a low loss dielectric material and having an extendible edge lip at the forward upstream edge thereof, for acting as an air deflector.

10. A dehydration plant according to claim 9 wherein the extendible edge lip further includes a row of resilient prongs for engaging an underside of the conveyor belt to thereby provide agitation of the said conveyor belt.

11. A dehydration plant according to claim 10 further including an upper reflector dish over each reflector dish of the conveyor segment, each said microwave emitter horn being located within a respective said upper reflector dish, at least one microwave deflector fan being further located within each said upper reflector dish.

12. A dehydration plant according to claim 1 wherein the circulation means includes an air circulation duct and a fan located within the duct for drawing air into the dehydration plant, the refrigerated dehumidification means and the heating means being located in the air duct downstream of the circulation fan.

13. A dehydration plant according to claim 12 wherein the refrigerated dehumidification means includes evaporation coils located immediately downstream of the circulation fan for cooling and therefore dehumidifying the air, and wherein the heating means includes a heat exchanger provided downstream of the evaporator coils for adding heat to the cooled air.

14. A dehydration plant according to claim 13 wherein a further heat exchanger is provided upstream of the circulation fan, said further heat exchanger absorbing heat from air exiting the kiln tunnel.

15. A dehydration plant according to claim 13 or 14 wherein the refrigerated dehumidification means includes condenser coils located downstream of the heat exchanger to further heat the air passing therethrough.

16. A dehydration unit according to claim 14 further including heating coils located downstream of the condenser coils for provide a further heat input into the dehumidified heated air prior to circulation into the microwave kiln.

17. A dehydration plant according to claim 13 further including a mixing vane within the air duct for controlling the amount of air recirculated through the air duct and the amount of air exhausted from the dehydration plant.

18. A dehydration plant according to claim 1 further including a transportable enclosure for accommodating the dehydration plant.

19. A dehydration unit according to claim 18 wherein the enclosure is an insulated standardised industrial freight container.

20. A dehydration unit according to claim 18 or 19 further including an intake conveyor for transporting food products through an inlet opening in the enclosure to the microwave kiln, and a discharge conveyor for transporting dehydrated food products from the microwave kiln and though a discharge opening of the enclosure.

21. A dehydration plant according to claim 20 further including a food pretreatment zone provided over at least a portion of the intake conveyor for preheating and bacterial control of the food product entering the microwave kiln.

22. A dehydration plant according to claim 20 wherein the intake and discharge conveyors are retractable into the enclosure, and the inlet and openings of the enclosure include closure means for sealing the dehydration plant within the enclosure.

23. A method of operating a dehydration plant for dehydrating food products, the method comprising:

(a) conveying a food product along a conveying path through a microwave kiln;

(b) dehumidifying and heating air within the plant;

(c) circulating the dehumidified heated air through the microwave kiln, such that the food product is simultaneously exposed to both microwave emissions and the circulated dehumidified heated air within the microwave kiln; and (d) cascading the food product through a plurality of vertical drops spaced along the conveying path within the microwave kiln during step (c) to thereby maximize exposure of the food product to the circulated dehumidified heated air.

24. A method according to claim 23 including collecting the heat of the air that has passed through the microwave kiln and supplying said collected heat to the air upstream of the microwave kiln.

25. A method according to claims 23 or 24 further including heating the food product upstream of the microwave kiln.

26. A method according to claim 23 further including exposing the food product to ultra-violet radiation upstream of the microwave kiln for providing bacterial control for the food product.

27. A method according to claim 23 including conveying the food product through a coupled series of said dehydration plants.

28. A plurality of dehydration plants according to any one of claims 1 to 21, said dehydration plants being coupled in series.

29. In combination, a plurality of dehydration plants for dehydrating food products, the dehydration plants arranged in series to successively dehydrate the food products, each dehydration plant comprising:

(a) a microwave kiln;

(b) conveyor means for conveying food products along a conveying path through the kiln, the conveyor means including a plurality of conveyor segments, each said conveyor segment having a forward upstream end and a rear downstream end, the conveyor segments being positioned in an overlapping arrangement such that the rear downstream ends of at least two of said conveyor segments are spaced above the forward upstream ends of the next respective conveyor segments to define vertical drops spaced along the conveying path through which food products fall, (c) circulation means for circulating air through the kiln including the vertical drops;

(d) refrigerated dehumidification means for dehumidifying the air to be circulated through the kiln; and (e) heating means for heating the air to be circulated through the kiln; such that food products conveyed through the kiln are simultaneously exposed to both microwave emissions and the flow of dehumidified heated air to thereby dehydrate the food products.

* * * * *